US009853299B2

(12) United States Patent
Jeong

(10) Patent No.: US 9,853,299 B2
(45) Date of Patent: Dec. 26, 2017

(54) POROUS SEPARATOR FOR FUEL CELL

(75) Inventor: Hee Seok Jeong, Seoul (KR)

(73) Assignee: Hyundai Motor Company, Seoul (KR)

( * ) Notice: Subject to any disclaimer, the term of this patent is extended or adjusted under 35 U.S.C. 154(b) by 235 days.

(21) Appl. No.: 13/489,728

(22) Filed: Jun. 6, 2012

(65) Prior Publication Data

US 2013/0149633 A1    Jun. 13, 2013

(30) Foreign Application Priority Data

Dec. 13, 2011  (KR) .................. 10-2011-0133461

(51) Int. Cl.
| | | |
|---|---|---|
| *H01M 8/02* | (2016.01) | |
| *H01M 8/04* | (2016.01) | |
| *H01M 8/0254* | (2016.01) | |
| *H01M 8/026* | (2016.01) | |
| *H01M 8/0271* | (2016.01) | |
| *H01M 8/0263* | (2016.01) | |
| *H01M 8/0258* | (2016.01) | |
| *H01M 8/0267* | (2016.01) | |

(52) U.S. Cl.
CPC ......... *H01M 8/0254* (2013.01); *H01M 8/026* (2013.01); *H01M 8/0258* (2013.01); *H01M 8/0263* (2013.01); *H01M 8/0267* (2013.01); *H01M 8/0271* (2013.01)

(58) Field of Classification Search
USPC ........................................................ 429/514
See application file for complete search history.

(56) References Cited

U.S. PATENT DOCUMENTS

| | | | | |
|---|---|---|---|---|
| 3,432,357 | A * | 3/1969 | Dankese .................. | B01D 1/00 165/166 |
| 5,776,624 | A * | 7/1998 | Neutzler ............. | H01M 8/0206 429/210 |
| 7,585,582 | B2 | 9/2009 | Chen et al. | |
| 2003/0215695 | A1 | 11/2003 | Suzuki et al. | |
| 2005/0164071 | A1* | 7/2005 | Horiguchi ........... | H01M 8/0228 429/450 |
| 2006/0024560 | A1* | 2/2006 | Ishioka ............... | H01M 8/0247 429/434 |
| 2011/0244369 | A1* | 10/2011 | Kondo ................ | H01M 8/0247 429/513 |

FOREIGN PATENT DOCUMENTS

| | | |
|---|---|---|
| CN | 1665058 A | 9/2005 |
| JP | 05029009 A | 2/1993 |
| JP | 2005-285685 A | 10/2005 |
| JP | 2005340179 A | 12/2005 |
| JP | 2006-253036 A | 9/2006 |

(Continued)

*Primary Examiner* — Daniel Gatewood
(74) *Attorney, Agent, or Firm* — Mintz Levin Cohn Ferris Glovsky and Popeo, P.C.; Peter F. Corless

(57) ABSTRACT

Discloses is a porous separator for a fuel cell. The porous separator includes a flow plate and a flat plate. The flow plate includes a first flow surface upwardly inclined and having a first plurality of flow apertures and a second flow surface downwardly inclined and having a second plurality of flow apertures that are repeatedly arranged along a longitudinal direction of the flow plate. The flow plate is disposed between a gas diffusion layer of a fuel cell and a flat plate to seal the flow plate and create a flow path for hydrogen or air therein.

9 Claims, 4 Drawing Sheets

(56) References Cited

FOREIGN PATENT DOCUMENTS

| | | |
|---|---|---|
| JP | 2008-103142 A | 5/2008 |
| JP | 2008103168 A | 5/2008 |
| JP | 2009-193724 A | 8/2009 |
| JP | 2010118329 A | 5/2010 |
| KR | 10-2006-0022017 | 3/2006 |
| KR | 10-2006-0047536 A | 5/2006 |
| KR | 10-2008-0095569 | 10/2008 |

* cited by examiner

POROUS SEPARATOR FOR FUEL CELL

CROSS-REFERENCE TO RELATED APPLICATION

This application claims under 35 U.S.C. §119(a) the benefit of Korean Patent Application No. 10-2011-0133461 filed Dec. 13, 2011, the entire contents of which are incorporated herein by reference.

BACKGROUND (a) Technical Field

The present invention relates to a porous separator for a fuel cell. More particularly, the present invention relates to a porous separator that has a shape that induces a turbulent to flow of reactant gases and has an improved structure with excellent workability.

(b) Background Art

Referring to FIG. 6 that shows the conventional structure of a fuel cell stack, a Membrane-Electrode Assembly (MEA) is disposed in the middle of the fuel cell stack. The MEA includes a polymer electrolyte membrane 10 that allows hydrogen protons to pass through, and a cathode 12 and an anode 14 that are catalyst layers coated on the both sides of electrolyte membranes such that hydrogen and oxygen react with each other.

Also, gas diffusion layers (GDL) 16 are stacked on the outer sides of the electrode membrane, i.e., the cathode 12 and anode 14, and separators 20 with a flow field formed therein are disposed on the outer sides of the gas diffusion layer 16 to provide fuel and discharge water generated from a reaction while allowing a gasket 18 to be interposed between the separators 20. An end plate 30 is disposed at the outermost side of the fuel cell stack to support and fix the above components.

Within the anode 14 of the fuel cell stack an oxidization reaction of hydrogen is performed to generate protons and electrons, which move to the cathode 12 through the polymer electrolyte membrane 10 and the separator 20, respectively. Protons, electrons from the anode 14, and oxygen in the air electrochemically react in the cathode 12 to generate water, and simultaneously electrical energy is generated from the flow of electrons.

Generally, the separator 20 may have a structure in which lands (closely supported by the gas diffusion layer and channels (flow field) serving as a flow path of a fluid) are repeatedly disposed. Specifically, since a typical separator has a structure in which lands and channels (flow field) are repeatedly curved, a channel on one side facing the gas diffusion layer is utilized as a space in which reactant gases such as hydrogen and air flow, and a channel on the opposite side is utilized as a space in which cooling water flows. Accordingly, one unit cell may include two separators, one separator that has a channel for hydrogen/cooling water and the other separator that has a channel for oxygen/cooling water.

For example, Korean Patent Application Publication No. 10-2011-0091520 (filed on Sep. 9, 2011) teaches a porous separator in which reactant gases form a turbulent flow and are more easily diffused into a gas diffusion layer than a typical separator. Hereinafter, a detailed description thereof will be made with reference to FIG. 5 and FIG. 6.

In the above patent application, a plurality of flow apertures are formed on a metal plate using an etching process, and then the pressing process is performed using a mold having an embossed shape in which a protruded portion and a recessed portion are repeatedly formed. As shown in FIG. 5, the porous separator 20 manufactured by such a process has a plurality of flow apertures 23 arranged in a zigzag pattern and penetrating therethrough. Also, the protruded portion 21 closely adhered to a flat plate 24 and the recessed portion 22 closely adhered to the gas diffusion layer 16 adjacent to the anode 14 or the cathode 12 are formed in a zigzag pattern.

In this case, the flat plate 24 serves as a sealing partition for a hydrogen or oxygen channel, and a space between a flat plate 24 included in one cell and a flat plate 24 included in another cell becomes a cooling water channel that is sealed by gaskets, etc. Accordingly, reactant gases may flow in the vertical and horizontal directions along the protruded portion and the recessed portion while passing through the flow aperture of the porous separator, causing a turbulent flow to the reactant gases. By delivering the reactant gases to the gas diffusion layer in a turbulent flow, the diffusion of the reactant gases increases as a result, thereby improving the performance of the fuel cell.

However, since in this above described porous separator, not only the flow apertures but also the protruded portions and the recessed portions are formed in a zigzag pattern, the overall shape and structure of the porous separator are very complicated, resulting in a more difficult manufacturing press mold and higher costs for production. Thus, a more simplistic design that provides similar results is greatly needed.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a porous separator for a fuel cell, which causes turbulent flow to reactant gases, is easily manufactured due to simplification of its shape, and can reduce the flow resistance of reactant gases.

In one aspect, the present invention provides a porous separator for a fuel cell, including: a flow plate that may have a first flow surface upwardly inclined and having a plurality of flow apertures, and a second flow surface downwardly inclined and having a plurality of flow apertures that are repeatedly arranged along a longitudinal direction of the flow plate, and closely adhered to an outer surface of a gas diffusion layer of a fuel cell. The porous separator may also include a flat plate coupled to an outer surface of the flow plate to seal the flow plate serving as a hydrogen or air channel.

In an exemplary embodiment, when a plurality of cells constituting the fuel cell are stacked on each other, a gap between the flat plates of each cell may serve as a cooling water channel. Also, the flow apertures formed in the first flow surface of the flow plate and the flow apertures formed in the second flow surface of the flow plate are arranged in a zigzag pattern. In some exemplary embodiments, the first flow surface and the second flow surface may be joined to each other to form a waveform section.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
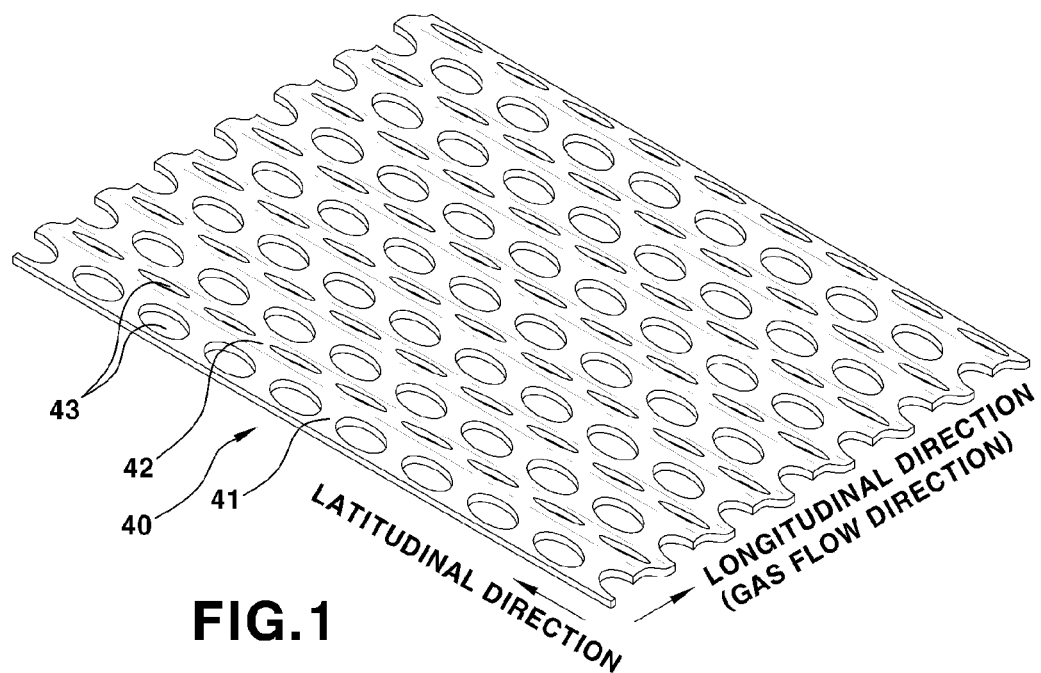
FIG. 1 is a perspective view illustrating a porous separator for a fuel cell according to an exemplary embodiment of the present invention.

Reference numerals set forth in the Drawings includes reference to the following elements as further discussed below:

10: electrolyte membrane
12: cathode
14: anode
16: gas diffusion layer
18: gasket
20: separator
21: protruded portion
22: recessed portion
23: flow aperture
24: flat plate
30: end plate
40: flow plate
41: first flow surface
42: second flow surface
43: flow aperture
50: flat plate
52: cooling medium channel It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described in detail with reference to the accompanying drawings.

Figure 2:
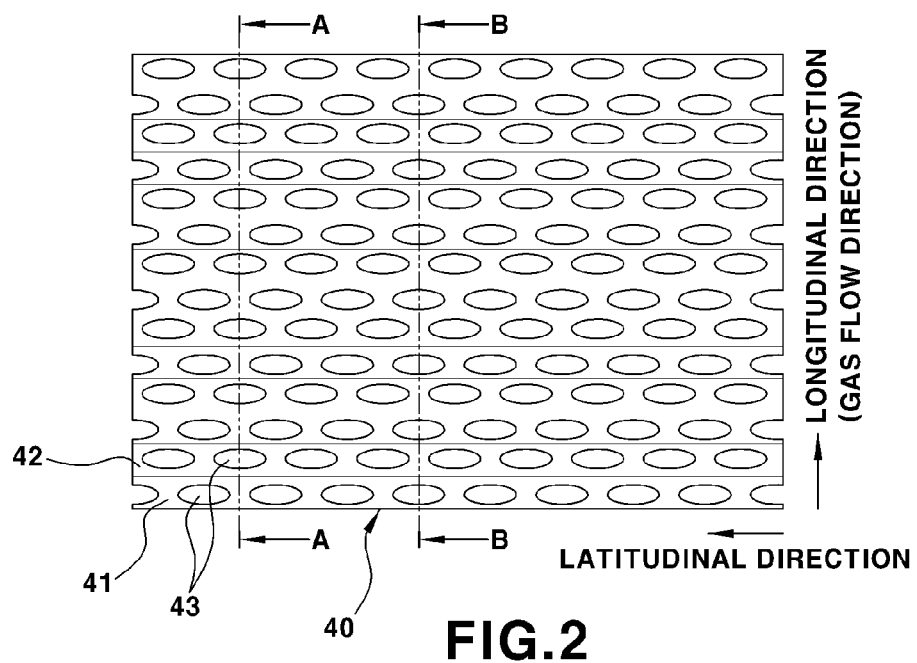
FIG. 2 is a plan view illustrating a porous separator for a fuel cell according to an exemplary embodiment of the present invention.
Figure 3:
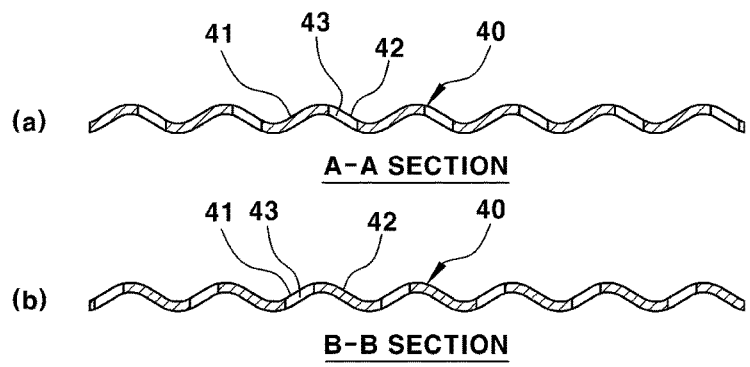
FIG. 3 is a side view illustrating a porous separator for a fuel cell according to an exemplary embodiment of the present invention.

FIG. 1 is a perspective view illustrating a porous separator for a fuel cell according to an exemplary embodiment of the present invention. FIG. 2 is a plan view illustrating a porous separator for a fuel cell according to the exemplary embodiment of the present invention. FIG. 3 is a side view illustrating a porous separator for a fuel cell according to the exemplary embodiment of the present invention along lines A-A and B-B.

As shown in FIGS. 1 through 3, a porous separator according to an embodiment of the present invention may include a flow plate 40 in which a first flow surface 41 that is upwardly inclined and a second flow surface 42 that is downwardly inclined in a parabolic manner are repeatedly arranged along the longitudinal direction (gas flow direction). More specifically, the upwardly inclined first flow surface ascends upward until it meets the second flow surface to form a continuous sinusoidal shape composed of a plurality of parabolic formations.

More specifically, the flow plate 40 may be manufactured to have a structure in which the upwardly inclined first flow surface 41 has a plurality of flow apertures 43 penetrating therethrough and the downwardly inclined second flow surface 42 has a plurality of flow apertures 43 penetrating therethrough are repeatedly arranged along the longitudinal direction of the flow plate 40.

The flow plate 42 may be manufactured by a process of penetrating a plurality of flow aperture through a flat metal plate by chemical etching or mechanical punching and a process of pressing the metal plate with the flow apertures in a press mold. After the pressing process, the flow plate 40 may have a structure in which the upwardly inclined first flow surface 41 and the downwardly inclined second flow surface 42 are repeatedly arranged to form a waveform structure. Thus, the flow plate must be made of a material capable of being press molded, e.g. aluminum, or any other moldable material.

The flow apertures 43 formed in the first flow surface 41 of the flow plate 40 may be disposed at a uniform interval along the latitudinal direction of the first flow surface 41, and the flow apertures 43 formed in the second flow surface 42 may also be disposed at uniform intervals along the latitudinal direction of the first flow surface 41. In this case, the flow apertures 43 of the first flow surface 41 and the flow apertures 43 of the second flow surface 42 may be arranged in a zigzag pattern along the longitudinal direction of the flow plate 40. The flow plate 40 may be closely adhered to the outer surface of a gas diffusion layer (16 of FIG. 4) to serve as a hydrogen or air channel through which hydrogen or air flows.

When the flow plate 40 serves as a hydrogen or air channel, the flow plate 40 is sealed so that hydrogen or air does not leak to outside of the channel. For this, the separator 20 may include a flat plate 50 that is formed of metal and stacked on and joined with the outer surface of the flow plate 40.

Therefore in the illustrative embodiment of the present invention, since the separator 20 the structure is formed as a waveform, the hydrogen or air flowing therethrough is effectively turbinated while at the same time providing a more simplistic design that is more cost effective to produce and does not require the use of a mold.

Figure 4:
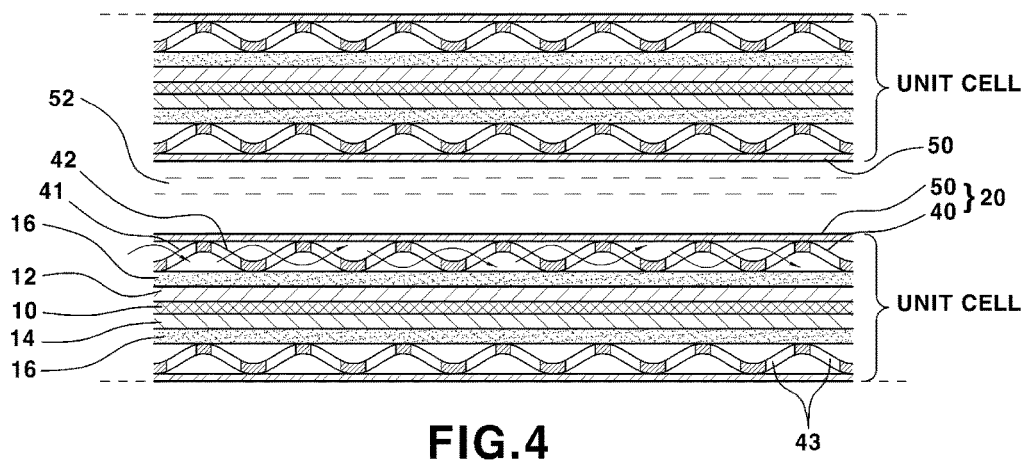
FIG. 4 is a perspective view illustrating a porous separator for a fuel cell assembled into a fuel cell stack according to an exemplary embodiment of the present invention.
Figure 5:
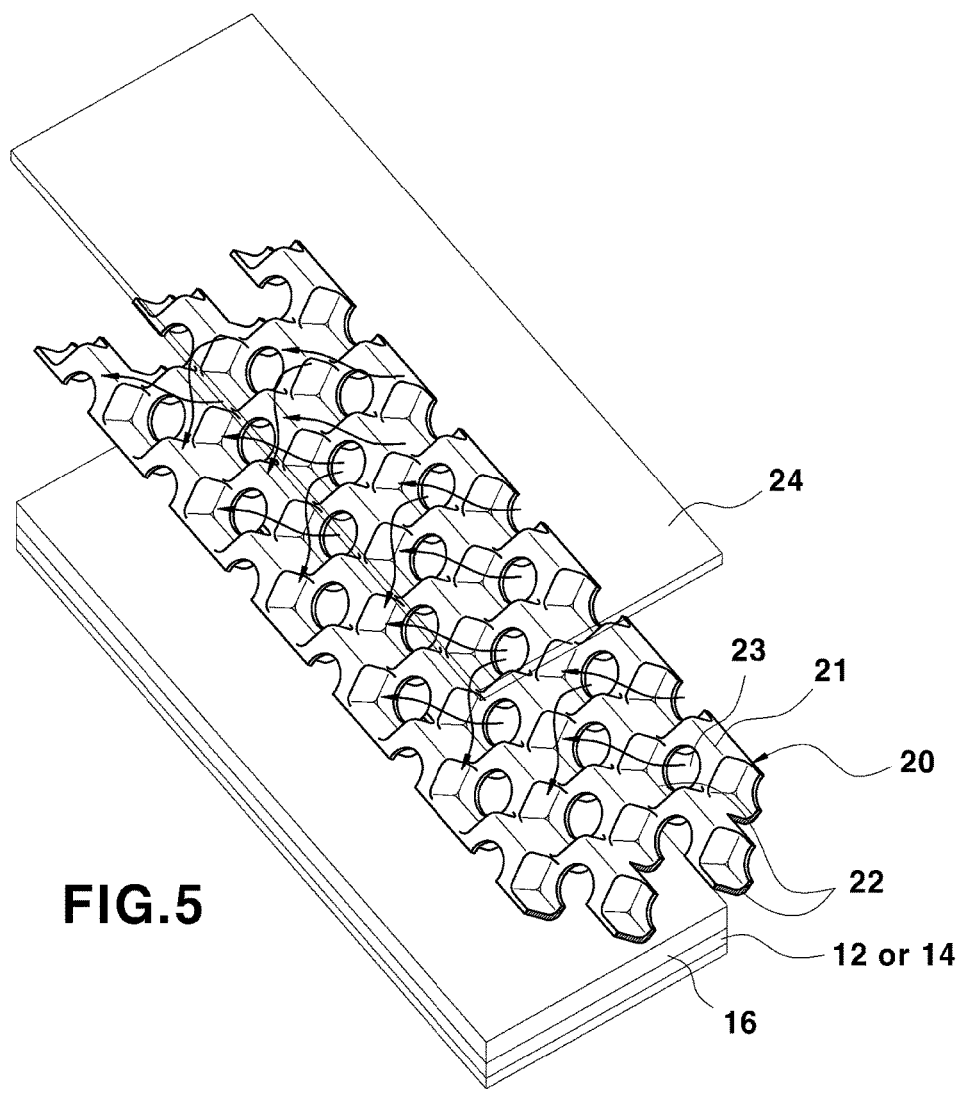
FIG. 5 is a schematic view illustrating a related porous separator for a fuel cell.
Figure 6:
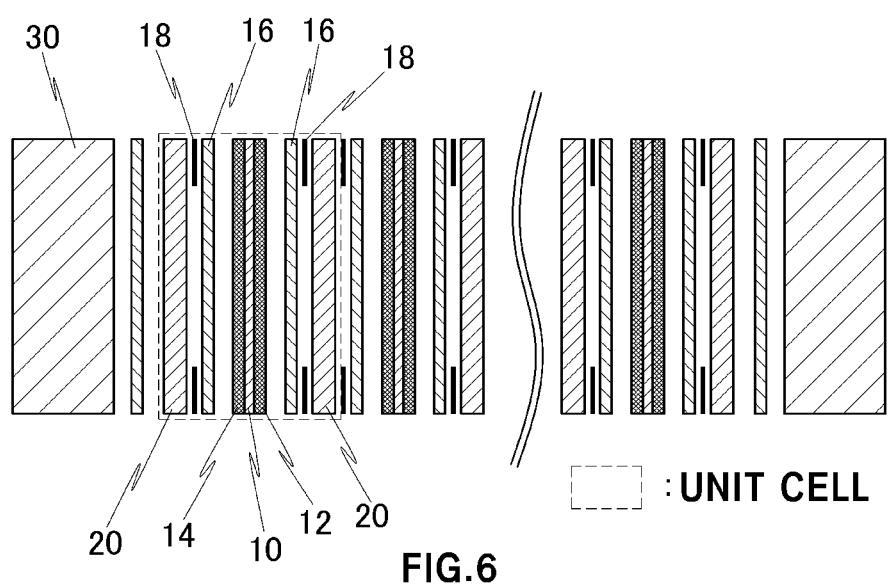
FIG. 6 is a schematic view illustrating a conventional configuration of a fuel cell stack.

FIG. 4 illustrates a porous separator assembled into a fuel cell stack according to the exemplary embodiment of the present invention. As shown in FIG. 4, when a cathode 12 and an anode 14 are disposed on both surfaces of a polymer electrolyte membrane 10 to serve as a catalyst layer in which hydrogen and oxygen react with each other, and are coupled to the gas diffusion layer 16 at the outer side thereof, the flow plate 40 constituting the separator 20 may be stacked on the gas diffusion layer 16. In this case, a portion (lowermost point of the waveform structure) of the flow plate 40 where the upwardly inclined first flow surface 41 and the downwardly inclined second flow surface 42 are joined to each other may linearly contact the gas diffusion layer 16. Thereafter, the flat plate 50 constituting the separator plate 20 may be stacked on the outer side of the flow plate 40. More specifically, the flat plate 50 may linearly contact a portion (uppermost point of the waveform structure) of the flow plate 40 where the upwardly inclined first flow surface 41 and the downwardly inclined second flow surface 42 are joined to each other to form one cell of a fuel cell stack, i.e., unit cell.

A fuel cell stack may include several tens or hundreds of unit cells stacked on each other. When a plurality of cells are stacked to form a fuel cell, a gap between the flat plates 50 of each cell may serve as a cooling medium channel 52 that is sealed by a gasket (not shown). Accordingly, when air or hydrogen is supplied from the cathode to the anode of a fuel cell stack, air or hydrogen may upwardly flow along the first flow surface 41 of the flow plate 40, and then downwardly flow along the second flow surface 42, thereby causing flow of vertical direction. Simultaneously, air or hydrogen may flow through the flow apertures 43 of the first flow surface 41 and then flow through the flow apertures 43 of the second flow surface 42 while diverging into right and left flow, thereby causing flow of horizontal direction. Thus, the effective result of the above described porous separator is a turbulent flow path through the hydrogen or air channels.

That is, since air or hydrogen flows in the vertical direction along the first flow surface 41 and the second flow surface 42, and simultaneously flows in the horizontal direction along the flow aperture 43 of the first flow surface 41 and the second flow surface 42, a turbulent flow of the reactant gases (i.e., the hydrogen and air) is generated, thereby increasing the diffusion of the reactant gases into the gas diffusion layer. Simultaneously, the cooling medium for cooling the stack flows through the cooling medium channel 52 between the flat plates 50 of each cell.

Advantageously, since a separator according to an embodiment of the present invention has a structure in which a first flow surface upwardly inclined and having a plurality of flow apertures and a second flow surface downwardly inclined and having a plurality of flow apertures are repeatedly arranged to form a waveform section along the longitudinal length, turbulent flow of the reactant gases may be generated, while at the same time simplifying the shape of the plate and thus the manufacturing costs associated therewith. Also, diffusion of reactant gases into a gas diffusion layer can be increased while reducing the flow resistance of reactant gases. Furthermore, since the shape of the separator is simplified, the manufacturing costs can be effectively reduced.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A porous separator for a fuel cell, comprising:
a flow plate including a first flow surface upwardly inclined and having a first plurality of flow apertures, a second flow surface downwardly inclined and having a second plurality of flow apertures, a third flow surface upwardly inclined and connected to the second flow surface and having a third plurality of flow apertures, and a fourth flow surface downwardly inclined and connected to the third flow surface and having a plurality of fourth apertures that are repeatedly arranged along a longitudinal direction of the flow plate, and closely adhered to an outer surface of a gas diffusion layer of a fuel cell; and
a flat plate coupled to an outer surface of the flow plate to seal the flow plate serving as a hydrogen or air channel,
wherein first center lines of the first plurality of flow apertures formed in the first flow surface of the flow plate and the third plurality of flow apertures formed in the third flow surface of the flow plate and second center lines of the second plurality of flow apertures formed in the second flow surface of the flow plate and the fourth plurality of flow apertures formed in the fourth flow surface of the flow plate are not coincident with each other so as to be arranged in a zigzag pattern along the longitudinal direction so that reactant gases flow through the flow apertures of the first flow surface and then flows through the flow apertures of the second flow surface while diverging into a rightward and leftward flow to cause flow in a horizontal direction, and
wherein the first flow surface ascends upward until the first flow surface meets the second flow surface and the third flow surface ascends upward until the third flow surface meets the fourth flow surface to form a waveform structure composed of a plurality of parabolic formations, where sloped surfaces of the parabolic formations are orthogonal to a reactant gas flow direction along the longitudinal direction of the flow plate, and the flow apertures are only formed through a side of the sloped surfaces of the parabolic formations in the longitudinal direction, such that, when reactant gases are supplied from a cathode to an anode of a fuel cell stack, reactant gas upwardly flows along the first flow surface of the flow plate, and then downwardly flow along the second flow surface a flow in a vertical direction is produced.

2. The porous separator of claim 1, wherein when a plurality of cells constituting the fuel cell are stacked on top of each other, and a gap between the flat plates of each cell serves as a cooling medium channel.

3. The porous separator of claim 1, wherein the first flow surface and the second flow surface are joined to each other to form a waveform structure.

4. The porous separator of claim 1, wherein the waveform structure is configured to create turbulence in a hydrogen flow path in one unit of a fuel cell.

5. The porous separator of claim 1, wherein the waveform structure is configured to create turbulence in an air flow path in one unit of a fuel cell.

6. The porous separator of claim 1, wherein flow plate is made of a material capable of being press molded.

7. The porous separator of claim 1, wherein the flow plate is disposed between the flat plate and a gas diffusion layer of a unit of a fuel cell.

8. A flow plate for a fuel cell separator, comprising:
a flow plate including
a plurality of first flow surface upwardly inclined and a plurality of second flow surface downwardly inclined wherein each first flow surface ascends upwardly until the first flow surface meets the second flow surface to form a continuous sinusoidal shape throughout the flow path of the flow plate;
a plurality of flow apertures repeatedly arranged on both the first flow surface and the second flow surface in a zigzag pattern; and
a plurality of third flow surface upwardly inclined and connected to the plurality of second flow surface and having a plurality of flow apertures, and a plurality of fourth flow surface downwardly inclined and connected to the plurality of third flow surface and having a plurality of apertures,
wherein the flow plate is disposed between a gas diffusion layer in the fuel cell and a flat plate to form a flow channel therein,
wherein first center lines of the first plurality of flow apertures formed in the first flow surface of the flow plate and the third plurality of flow apertures formed in the third flow surface of the flow plate and second center lines of the second plurality of flow apertures formed in the second flow surface of the flow plate and the fourth plurality of flow apertures formed in the fourth flow surface of the flow plate are not coincident with each other so as to be arranged in a zigzag pattern along the longitudinal direction so that reactant gases flow through the flow apertures of the first flow surface and then flows through the flow apertures of the second flow surface while diverging into a rightward and leftward flow to cause flow in a horizontal direction, and
wherein the first flow surface ascends upward until the first flow surface meets the second flow surface and the third flow surface ascends upward until the third flow surface meets the fourth flow surface to form a continuous sinusoidal shape composed of a plurality of parabolic formations in which the flow apertures are only formed through a side of sloped surfaces thereof in the longitudinal direction and the sloped surfaces are positioned orthogonal to a reactant flow direction along the longitudinal direction of the flow plate, such that, when reactant gases are supplied from a cathode to an anode of a fuel cell stack, reactant gas upwardly flows along the first flow surface of the flow plate, and then downwardly flow along the second flow surface a flow in a vertical direction is produced.

9. A fuel cell having a porous separator, comprising:
a flow plate including a first flow surface upwardly inclined and having a first plurality of flow apertures, a second flow surface downwardly inclined and having a second plurality of flow apertures, a third flow surface upwardly inclined and connected to the second flow surface and having a third plurality of flow apertures, and a fourth flow surface downwardly inclined and connected to the third flow surface and having a plurality of fourth apertures that are repeatedly arranged along a longitudinal direction of the flow plate, and closely adhered to an outer surface of a gas diffusion layer of a fuel cell; and
a flat plate coupled to an outer surface of the flow plate to seal the flow plate serving as a hydrogen or air channel,
wherein first center lines of the first plurality of flow apertures formed in the first flow surface of the flow plate and the third plurality of flow apertures formed in the third flow surface of the flow plate and second center lines of the second plurality of flow apertures formed in the second flow surface of the flow plate and the fourth plurality of flow apertures formed in the fourth flow surface of the flow plate are not coincident with each other so as to be arranged in a zigzag pattern along the longitudinal direction so that reactant gases flow through the flow apertures of the first flow surface and then flows through the flow apertures of the second flow surface while diverging into a rightward and leftward flow to cause flow in a horizontal direction,
wherein the first flow surface ascends upward until the first flow surface meets the second flow surface and the third flow surface ascends upward until the third flow surface meets the fourth flow surface to form a waveform structure composed of a plurality of parabolic formations, where sloped surfaces of the first and second flow surfaces of the parabolic formations are orthogonal to a reactant gas flow direction along the longitudinal direction of the flow plate, and the flow apertures are only formed through a side of the sloped surfaces of the first and second flow surfaces of the parabolic formations in the longitudinal direction, such that, when reactant gases are supplied from a cathode to an anode of a fuel cell stack, reactant gas upwardly flows along the first flow surface of the flow plate, and then downwardly flow along the second flow surface a flow in a vertical direction is produced,
wherein a lowermost point of the waveform structure of the flow plate where the upwardly inclined first flow surface and the downwardly inclined second flow surface are joined to each other linearly contacts a gas diffusion layer of the fuel cell, and
wherein an uppermost point of the waveform structure of the flow plate where the upwardly inclined first flow surface and the downwardly inclined second flow surface are joined to each other linearly contacts the flat plate to form one cell of a fuel cell stack.

* * * * *